Figure 1:
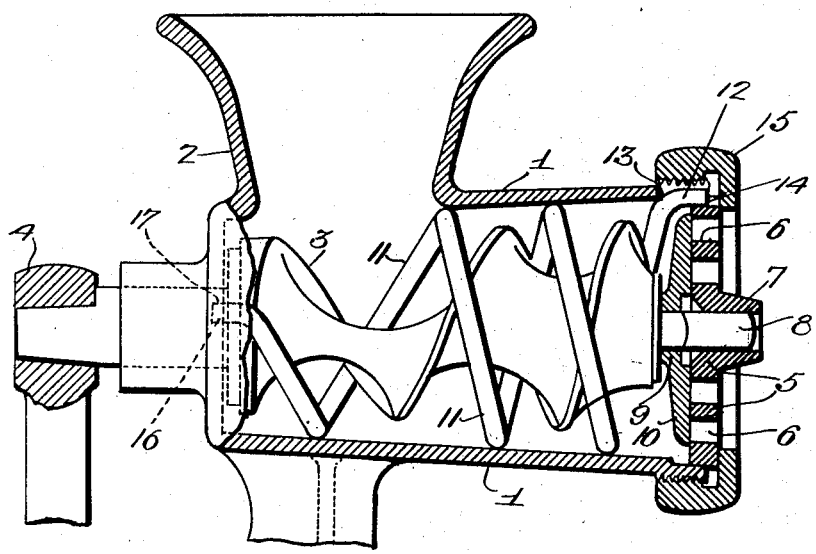

Nov. 28, 1939.   S. BRAUN   2,181,780
FOOD CHOPPER
Filed May 4, 1938

Inventor
Sylvan Braun
by his Attorneys
Howson & Howson

Patented Nov. 28, 1939

2,181,780

UNITED STATES PATENT OFFICE 2,181,780

FOOD CHOPPER

Sylvan Braun, Philadelphia, Pa., assignor to The Enterprise Manufacturing Company of Pennsylvania, Philadelphia, Pa., a corporation of Pennsylvania Application May 4, 1938, Serial No. 206,057

4 Claims. (Cl. 146—184)

This invention relates to new and useful improvements in food handling apparatus, and more particularly to devices of this general character commonly known as choppers for cutting and grinding foodstuffs such as meat, vegetables and the like.

Devices of the above character for the most part usually comprise a barrel portion having integral therewith an internal helical or straight rib which cooperates with the usual revoluble scroll or spiral conveyor to advance the foodstuffs toward the discharge end of said barrel and through the usual cutting devices and perforated end or die plate located at said discharge end of the chopper.

The presence of this integral helical rib on the inner wall of the chopper barrel renders cleaning of the device and particularly the barrel quite difficult, and also requires that the chopper including the barrel, its internal and usual feed hopper be made of relatively hard materials in order that the rib will withstand wear. This latter consideration substantially increases the cost of these devices above that possible were the barrel and feed hopper made of relatively softer materials.

Furthermore, the perforated end or die plates through which the foodstuffs are forced by the revolving scroll in cooperation with the internal rib are usually secured against relative rotation with respect to the barrel by means of pins or the like mounted in an aperture or socket for engagement with the plate. Arrangements of this nature are undesirable for several reasons, one of which is the extreme difficulty encountered in removing the pin from the chopper body, particularly in instances where such pin may be broken or sheared off in the aperture or socket.

With the foregoing observations in mind, one object of the present invention is to provide a food chopper of the general character set forth having a rib associated with the inner wall surface of the chopper barrel which is readily removable and replaceable so as to facilitate cleaning of the several parts of the device.

Another but equally important object of the invention is to provide a food chopper of the type described having a rib associated with the inner wall of the barrel thereof which is constructed and arranged to secure the perforated end or die plate against relative rotation with respect to the barrel.

Another object of the invention is to provide a food chopper of the stated character having an internal rib associated with the barrel which is readily detachable and interchangeable with other ribs for the purpose of varying the speed of travel of the foodstuffs through said barrel as desired.

A further object of the invention is to provide a device of the character set forth having a removable internal rib for the barrel of the body for the purpose of enabling said body to be made of relatively softer, less expensive materials.

Figure 2:
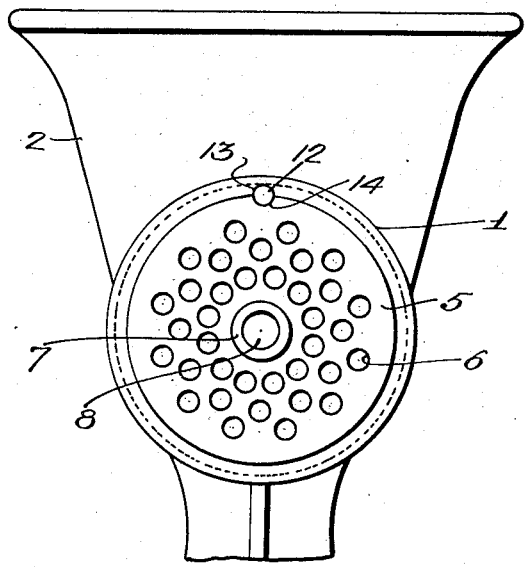

These and other objects and features of the invention, and the details of the construction and operation thereof, are hereinafter fully set forth and shown in the accompanying drawing, in which:

Figure 1 is a side view partially in section of the body portion of a food chopper embodying the present invention, and Figure 2 is a view in elevation of the discharge end of the chopper body disclosed in Figure 1, with the die plate retaining ring removed.

Referring now to the drawing, the invention is shown as applied to a food chopper of well known construction comprising a barrel 1 and a feed hopper 2 which communicates with said barrel at the upper rear end thereof. A revoluble scroll or spiral conveyor 3 is located within the barrel 1 and rotated in any suitable manner such as for example by means of a handle or crank 4 to force the material longitudinally through the barrel 1 to the severing or cutting devices.

As shown, a die or end plate 5 is mounted in the discharge end of the barrel and this plate 5 is provided with a plurality of perforations 6 therein through which the material is forced by the scroll or spiral conveyor 3. Also formed in the end of die plate 5 is a central bearing sleeve 7 for the trunnion 8 of the scroll or conveyor 3 which carries at its outer end a cutter member comprising a head 9 from which project radial cutting arms 10.

For the purpose of cooperating with the revoluble scroll or spiral conveyor 3 to facilitate and aid in forcing the material longitudinally through the barrel 1 to the severing or cutting devices, a helical rib 11 is associated with the inner wall surface of said barrel 1. This helical rib 11 is formed independently of the barrel 1 so as to be readily removable therefrom when it is desired to clean the device and its several parts or to enable the substitution for any one helical rib 11 of a similar rib having turns of greater or lesser pitch depending upon the speed with which it is desired to move the foodstuffs through said barrel 1. The material comprising or forming the several turns of the helical ribs 11 may be of any cross-section shape desired or suited to a particular chopping operation.

The helical rib 11 is of comparatively heavy rugged construction and is anchored or secured against relative rotation with respect to the barrel 1 by its outer end portion 12 which extends longitudinally of the barrel and engages a narrow open slot or groove 13 formed centrally and axially in the upper or top of the barrel at the discharge end thereof. This arrangement of securing the helical rib 11 against rotation relative to the barrel may also be effectively employed to secure the perforated end or die plate 5 stationary within the discharge end of the barrel 1 against relative rotation, and this is accomplished by extending or making the end portion 12 of said rib 11 of sufficient length to engage a key way or slot 14 provided or formed in the periphery of said end or die plate 5 in the manner shown in the drawing.

In addition to the foregoing, the end or die plate 5 is further secured in place by means of an adjusting ring or collar 15 which is threaded upon the external extremity of the barrel 1, and the helical rib 11 also may be further secured against relative rotation with respect to said barrel by extending the inner end portion 16 thereof longitudinally of the barrel for engagement with an aperture or opening 17 in the rear wall of said barrel as shown in Figure 1 of the drawing.

It will be observed from the foregoing that the present invention provides a novel internal rib structure for said barrel which is readily removable to permit easy cleaning of the device and interchangeable with other ribs of similar construction having a greater or lesser pitch or number of turns whereby the speed of travel of material through the barrel may be controlled, and at the same time provides an arrangement readily adaptable for anchoring or securing the end of die plate 5 of the chopper against rotation with respect to the barrel. In addition the present construction and arrangement permits relatively easy removal and replacement of the die plate securing means when the latter becomes worn or, in rare instances, broken due to the shearing action of said die plate, and at the same time facilitates removal or detachment of the die plate and other parts of the device for cleaning and other purposes.

The internal removable rib element may, of course, be employed with or without the arrangement for anchoring the die plate against rotation, and while a certain embodiment of the present invention has been set forth and illustrated for descriptive purposes, it is not intended that said invention shall be precisely limited thereto but that changes and modifications may be made and incorporated therein within the scope of the annexed claims.

I claim:

1. In a device of the character described including a barrel having a slot therein and a peripherally slotted perforate die plate arranged for removable insertion in the outer end of said barrel, an element removably mounted in said barrel providing a rib in association with the inner wall thereof and having a portion engaging the slots in the barrel and the perforate die plate for the purpose of securing said element and die plate against rotation with respect to said barrel portion.

2. In a device of the character described including a barrel having a slot therein and a peripherally slotted perforate die plate arranged for removable insertion in the outer end of said barrel, an element removably mounted in said barrel providing a rib in association with the inner wall thereof and having a portion thereof engaging the slots in the barrel portion and the perforate die plate for the purpose of securing said element and die plate against rotation with respect to said barrel, said element having another portion engaging an aperture in the inner end wall of the barrel to further secure the element against rotation with respect to said barrel.

3. In a device of the character described including a barrel and a peripherally slotted perforate die plate arranged for removable insertion in the outer end of said barrel, the barrel having a slot therein substantially aligned with the slot in said perforated die plate, an element removably mounted in said barrel providing a rib in association with the inner wall thereof and having its outer end portion engaging the slots in the die plate and the barrel for respectively securing said die plate and element against rotation with respect to said barrel.

4. In a device of the character described comprising a barrel portion, a helical element removably mounted in said barrel portion providing a rib in association with the inner wall thereof, said element having its opposite end portions engaging recesses in the barrel portion to secure the element against rotation with respect to said barrel.

SYLVAN BRAUN.